No. 773,825. PATENTED NOV. 1, 1904.
J. F. THOMAS.
UNIVERSAL HOSE COUPLING.
APPLICATION FILED APR. 14, 1904.
NO MODEL.
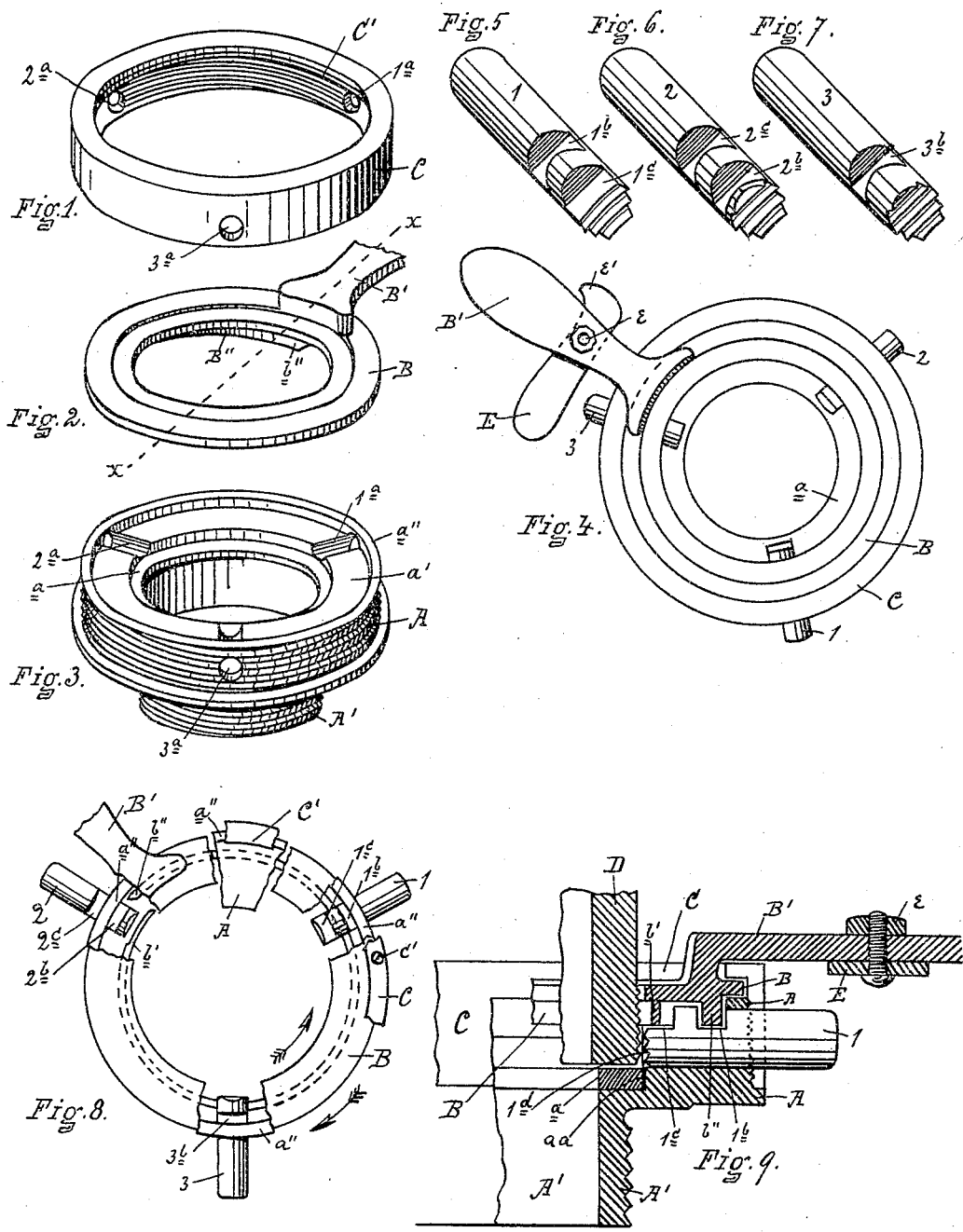
WITNESSES
Rich. A. George
D. C. Markham
INVENTOR
JOHN F. THOMAS
By Risley & Love
ATTORNEYS.

No. 773,825. Patented November 1, 1904.

UNITED STATES PATENT OFFICE.

JOHN F. THOMAS, OF ILION, NEW YORK.

UNIVERSAL HOSE-COUPLING.

SPECIFICATION forming part of Letters Patent No. 773,825, dated November 1, 1904.

Application filed April 14, 1904. Serial No. 203,063. (No model.)

*To all whom it may concern:*

Be it known that I, JOHN F. THOMAS, a citizen of the United States, residing at Ilion, in the county of Herkimer and State of New York, have invented certain new and useful Improvements in Universal Hose-Couplings, of which the following is a specification, reference being had therein to the accompanying drawings.

This invention relates to certain improvements in universal hose-couplings, and more particularly to couplings for attaching hose to screw-threaded plugs of varying sizes.

My invention consists of a device by which a union or coupling can be made between threaded members of different size or of a different pitch and which is simple, cheap, and efficient and which can, moreover, be readily applied under different conditions.

In the drawings I illustrate my invention in a coupling or union by which a hose of one gage or pitch can be attached to a hydrant or supply pipe of a different gage.

Figures 1, 2, and 3 show three separated members of the device in the relative positions they occupy when assembled. Fig. 4 is a top view of the same in assembled position, together with the thread-dogs shown in Figs. 5, 6, and 7. Fig. 8 is a top view of the member shown in Fig. 2, its flat portion being partly cut away to show the helical ridge on the under side and the location of the connected parts, the thread-dogs being shown in position to be engaged by the ridge. Fig. 9 is a cross-section view of the assembled device on line $x\ x$ of Fig. 2.

Referring to the figures in detail, Fig. 3 shows a core or box which comprises an annular part A, which is screw-threaded outwardly. From one side projects a hose-bib A', which is also screw-threaded on the outside. In case, for instance, my device is to be used by a fire or hose company this bib will be threaded to correspond with the thread of the hose used by that company, as the discharge-hose is to be attached to that side of the device. On the other side the core has a series of annular recesses, the smallest of which is of about the same diameter as the outside diameter of the bib and on which is seated a leather gasket $a$ or other suitable packing, the recess being suitably formed to retain the gasket in place, as at $a\ a$ in Fig. 9. The larger annular recess $a'$ forms a space for the play of parts of the thread-dogs 1, 2, and 3 and of ring B, as hereinafter shown. The edge $a''$ provides a surface on which the ring B rests and turns.

The core or box A is radially pierced in a sufficient number of places, as at $1^a$, $2^a$, and $3^a$, to receive the thread-dogs 1, 2, and 3.

The ring B has a handle B' for turning it. It is made of nearly the same outer diameter as that of edge $a''$ of the core A and freely turns thereon when the parts are assembled. Its inner diameter is large enough to admit a coupling or hydrant-bib (D in Fig. 9) against the gasket-face $a$. On its inner surface it is provided with a spiral or eccentrically-curved cam, flange, or ridge B'', Fig. 8, partly in dotted lines, whose ends $b'$ and $b''$ slightly overlap, as there seen, whose edge comes substantially against face $a'$ of core A.

C is a collar interiorly threaded to screw onto core A and having an inward overlap C' to hold ring B in place when the parts are assembled, in doing which handle B' is passed through the collar. The collar is radially pierced, as core A and as at $1^a$, $2^a$, and $3^a$ in Fig. 1, and parts A and C are so threaded that holes $1^a$, $2^a$, and $3^a$ in each will register when the parts are assembled.

Figs. 5, 6, and 7 show thread-dogs 1, 2, and 3, which are shown of approximately actual size. They are provided to slip in holes $1^a$, $2^a$, and $3^a$, respectively. They are shown as cylindrical in form, and each is provided with a transverse groove $1^b$, $2^b$, and $3^b$, respectively, and in which the ridge B'' on ring B engages to move them in or out by turning the ring, as will be shown. The cylindrical part of each dog extends no farther inward of the groove than the distance between the overlapping ends $b'$ and $b''$ of the ridge B''.

When parts A, B, and C have been assembled, the ring is turned to the position shown in Fig. 8 for inserting the dogs, which is done in the order 2, 3, and 1, each dog and its hole being similarly indicated. In that figure the eccentric ridge is shown partly in dotted lines.

Where the ring is broken away, a portion of core A is shown with the dogs in proper position to be picked up by the ridge B″ as the ring is turned. Of course when dog 3 is picked up 2 has moved inward as, they both have when dog 1 is taken on. The ring being in the position there shown, dog 2 is inserted and the ring turned in the direction shown by the inner arrow, Fig. 8, which passes ridge end $b″$ into groove $2^b$. Turning the ring further and nearly to point $3^a$ on the collar permits the insertion of dog 3, and on further turning the ring engages end $b″$ in groove $3^b$. Similarly dog 1 is inserted. The inner end of dog 1 is cut away, as at $1^c$, Figs. 8 and 9, so it can slip under ridge B″ and extend inwardly and equal distance with dogs 2 and 3. The handle is then further turned, and a stop $c'$ is put in a screw-hole in the top flange of collar C, which prevents the back turning of the handle and the dropping of the thread-dogs. To take out the dogs, the stop is removed and the handle turned, as shown by the outer arrow in Fig. 8, dog 1 being first taken out, then 3, and then 2. When the dogs are put in place, as just described, and the stop has been inserted, the device is operative by turning the handle to the right, (in the direction of the inner arrow in Fig. 8.) The ridge end $b″$ then passes through groove $2^c$ and bears on dog 2, as does end $b'$; but when end $b″$ comes to dog 3 it is stopped. In thus turning the ring from $1^a$ to $3^a$ the dogs have each been inwardly projected an equal distance.

At D in Fig. 9 is shown the bib of a hydrant or other supply pipe. It is of course threaded, though not necessarily of a given pitch. Its end is pressed against the gasket, or usually the coupling device will be put onto the hydrant-bib, and the handle B′ is then turned to the right, or in the direction indicated by the inner arrow in Fig. 8. The inner ends of the thread-dogs are transversely notched or threaded, as indicated at $1^d$ in Fig. 9, to engage the threads of the hydrant or supply bib; but the notches are of such size that they will readily engage threads of different pitch and make a firm coupling. The coupling device is then crowded to the right to press the gasket against the supply or hydrant bib. When the coupling is thus turned to the right, it screws up on the plug-bib D, as the transversely-threaded inner ends of the dogs mesh with the threads of the bib D, so that when the dogs are once set to receive a plug or hydrant bib of a certain size and are locked by the positive cam-lock E the coupling can be screwed onto or unscrewed from the bib D as with an ordinary coupling and without actuating or moving the dogs radially, which only then need setting or moving when the hose is to be attached to a plug or hydrant of a different size.

On handle B′ is lock E, pivoted at $e$ and provided with cam-head $e'$, which is crowded against the periphery of collar C and locks the handle and the thread-dogs in close contact with the hydrant or supply bib.

My invention can be applied in a great variety of ways for a great variety of purposes and can be made in a variety of forms, and I do not limit myself to the particular illustration given nor to the single purpose expressed. It might be used, as indicated, for a hydrant; but it can also be used as a coupling between pipes or other articles.

Having described my invention, what I claim as new, and desire to secure by Letters Patent, is—

1. As a new article of manufacture, a coupling having an eccentrically-curved ring and sliding dogs engaged thereby and having transversely-threaded inner ends to mesh with the threads of and screw on a threaded opposing member, substantially as shown.

2. As a new article of manufacture, a coupling comprising a series of slidingly-mounted dogs having their inner ends transversely threaded to engage a screw-threaded member to be connected, means to actuate said dogs comprising an eccentrically-mounted member engaging the dogs, and a positive lock for said means having an operating-handle, substantially as shown.

3. In a screw-threaded coupling, a coupling member having a plurality of movable clutching devices provided with the coupling-effecting screw-threads, means for simultaneously moving said devices to mesh the threads thereof with the threads of an opposing screw-threaded member, whereby said coupling member can be secured onto and coupled with opposing members differing in thread or size, substantially as described.

4. In a device of the character described, independently-removable sliding clutching members adapted to clutch a connected member, mechanism for placing and securing said clutching members in position, and means whereby said clutching members are removable independently of each other and of said mechanism, substantially as shown.

5. In a device of the character described, adjustable means for engaging the member to be connected, means provided to adjust the same in open or closed position and having an independently manually operative lock to positively lock said adjustable means at any position within their range of adjustment, and a seat to receive the edge of the member to be connected, substantially as shown.

6. In a device of the character described, adjustable means for engaging the member to be connected, means provided to adjust the same in open or closed position, a seat to receive the edge of the member to be connected, and a locking-cam having a handle for locking the adjustable members in a given position, substantially as shown.

7. In a coupling, a core having a seat to receive the opposing member, movable dogs for engaging said opposing member, a circumferentially-movable member engaging and simultaneously moving said dogs throughout their range of adjustment, and a positive lock provided with actuating means independent of said movable member to lock the same and said dogs at any position within their ranges of movement.

8. In a device of the character described, a coupling member having adjustable engaging means to secure the opposing member, means for simultaneously operating the said engaging means, and an independent manually-operated lock for locking the said engaging means in any given position within their range of adjustment.

9. In a device of the character described, a coupling member having a core provided with a seat for the edge of an opposing member, the opposing screw-threaded member, adjustable means provided in the core having screw-threaded portions to engage and screw on the thread of the opposing member, means for adjusting the said adjustable means, and means for locking the said adjustable means at any position within their range of movement.

10. In a coupling, a coupling member comprising a core having a seat to receive the opposing member, independently-removable sliding dogs to clutch said opposing member, a circumferentially-movable ring engaging and adjusting said dogs and removably confining the same in the core, a collar confining said ring to the core, and means whereby said dogs are removable independently of and without removing said collar and ring.

11. A coupling member comprising a core having radial passages, clutching-dogs slidable in said passages, an axially-movable ring having eccentric means engaging said dogs to adjust the same, a collar confining said ring to the core, said dogs projecting radially through said collar, and means whereby said dogs are removable independently of said collar.

12. A coupling member comprising a core, sliding clutching-dogs formed with transverse grooves, a movable dog-adjusting member having a spiral edge projecting into said grooves of all the dogs, said edge having its ends separated and overlapping for the purpose, substantially as described.

13. A coupling member comprising a core, sliding clutching-dogs arranged therein, each dog having a transverse groove, the grooves of the dogs being differently arranged, a circumferentially-movable member having a spiral flange or edge entering said grooves of all the dogs to simultaneously move all the dogs an equal distance, the ends of said flange being separated, whereby the dogs can be removed without removing said member.

14. A coupling member comprising a core having radial passages, sliding clutching-dogs in said passages and formed with transverse grooves, a circumferentially-movable ring having a spiral flange extending completely around the same with its ends separated, said flange entering said grooves, and means confining the ring to the core.

15. A coupling member comprising a core, radially-movable clutching devices, a circumferentially-movable member engaging said clutching devices for operating the same and provided with an operating-handle, and a positive movable lock carried by and moving with said member and provided with a controlling-handle and adapted to engage a part fixed to the core to positively lock said member at any point within its range of movement.

16. A coupling member comprising a core, radially-movable clutching devices, a circumferentially-movable ring engaging said devices to adjust the same, said ring having a laterally-extending handle rigid therewith, a swinging locking-lever carried by said handle, and means confining the ring to the core.

In testimony whereof I affix my signature in presence of two witnesses.

JOHN F. THOMAS.

Witnesses:
W. D. STONE,
E. T. DE GIORGI.